(12) United States Patent
Kim et al.

(10) Patent No.: US 9,680,563 B2
(45) Date of Patent: Jun. 13, 2017

(54) SYSTEM AND METHOD FOR PARTIAL BANDWIDTH COMMUNICATION

(71) Applicant: APPLE INC., Cupertino, CA (US)

(72) Inventors: Joonsuk Kim, Saratoga, CA (US); Yong Liu, Campbell, CA (US); Christopher Hansen, Cupertino, CA (US); Harish Ramamurthy, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 104 days.

(21) Appl. No.: 14/502,771

(22) Filed: Sep. 30, 2014

(65) Prior Publication Data

US 2015/0207599 A1    Jul. 23, 2015

Related U.S. Application Data

(60) Provisional application No. 61/928,747, filed on Jan. 17, 2014.

(51) Int. Cl.
*H04W 4/00* (2009.01)
*H04B 7/26* (2006.01)
*H04L 5/00* (2006.01)

(52) U.S. Cl.
CPC .......... *H04B 7/2621* (2013.01); *H04L 5/001* (2013.01); *H04L 5/0064* (2013.01); *H04L 5/0092* (2013.01); *H04L 5/0048* (2013.01)

(58) Field of Classification Search
None
See application file for complete search history.

(56) References Cited

U.S. PATENT DOCUMENTS

| | | | | |
|---|---|---|---|---|
| 9,246,729 | B2* | 1/2016 | Zhang | H04L 27/2602 |
| 2007/0237254 | A1* | 10/2007 | Pi | H04B 7/12 |
| | | | | 375/267 |
| 2012/0329502 | A1* | 12/2012 | Frederiksen | H04L 1/0026 |
| | | | | 455/509 |
| 2014/0044061 | A1* | 2/2014 | Yue | H04W 72/042 |
| | | | | 370/329 |
| 2014/0328313 | A1* | 11/2014 | Merlin | H04B 7/2621 |
| | | | | 370/330 |

(Continued)

*Primary Examiner* — Nicholas Sloms
(74) *Attorney, Agent, or Firm* — Fay Kaplun & Marcin, LLP

(57) ABSTRACT

A system and method for partial bandwidth communication. The system includes a device that has a transceiver configured to connect to a network, a memory storing an executable program and a processor. The program causes the processor to perform operations including receiving data to be transmitted to second device, determining if the data uses less than a predetermined bandwidth used as a unit for a carrier aggregation, determining a plurality of sub-bands in the predetermined bandwidth, each sub-band including at least one pilot and a plurality of frequency tones, receiving network information from the second device, the network information indicating a preferred sub-band of the sub-bands, assigning one of the sub-bands to the second device based upon the network information, generating a packet including an indication, the indication indicating the assigned sub-band; transmitting the packet to the second device and transmitting the data in the assigned sub-band.

19 Claims, 6 Drawing Sheets

(56) References Cited

U.S. PATENT DOCUMENTS

| | | | |
|---|---|---|---|
| 2015/0009894 A1* | 1/2015 | Vermani | H04L 1/0072 370/328 |
| 2015/0063255 A1* | 3/2015 | Tandra | H04J 11/0023 370/329 |
| 2015/0117428 A1* | 4/2015 | Lee | H04L 27/206 370/338 |
| 2016/0056943 A1* | 2/2016 | Stacey | H04L 5/0091 370/338 |
| 2016/0080043 A1* | 3/2016 | Tian | H04B 7/022 375/267 |

* cited by examiner

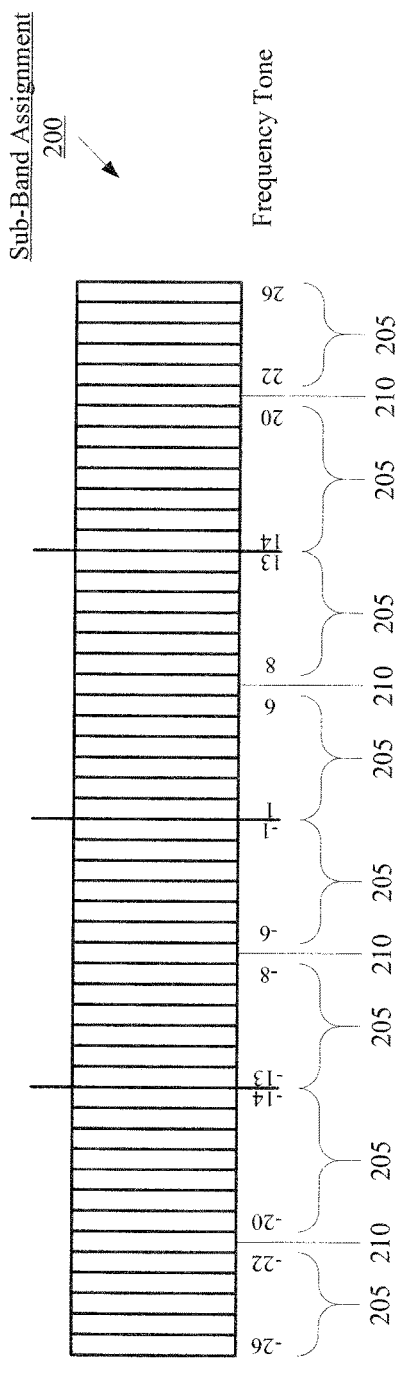
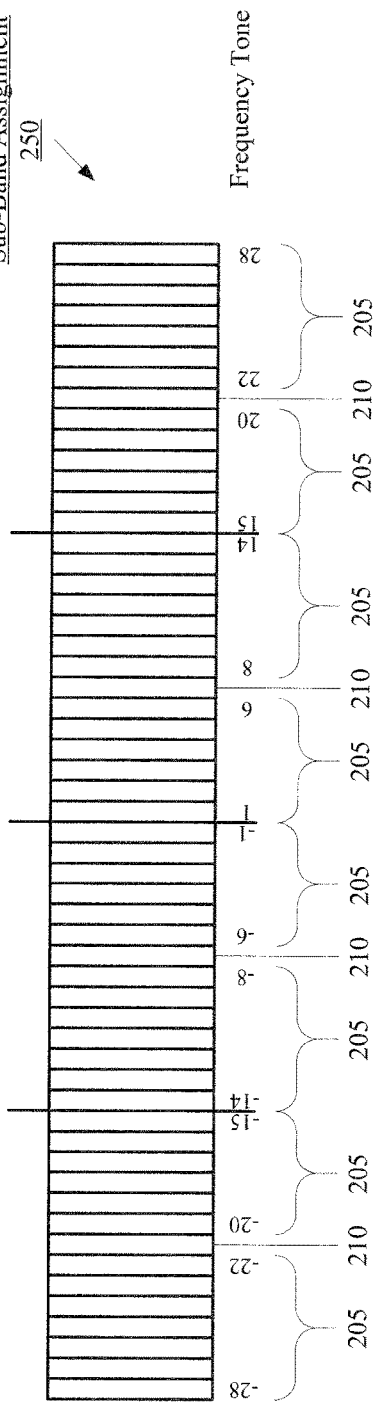
Prior Art
Fig. 2A
Prior Art
Fig. 2B

| Meaning | BW | NEW bit | STBC | Grp ID | Nsts1 | PAID if SU | | | ... | Rsv'd |
| --- | --- | --- | --- | --- | --- | --- | --- | --- | --- | --- |
| | | | | | | Nsts2 | Nsts3 | Nsts4 | | |
| bits | 2 | 1 | 1 | 6 | 3 | 3 | 3 | 3 | ... | 1 |

HEW-SIG1
320

Fig. 4

SYSTEM AND METHOD FOR PARTIAL BANDWIDTH COMMUNICATION

PRIORITY INFORMATION

This application claims priority to U.S. Provisional Application 61/928,747 entitled "System and Method for Partial Bandwidth Communication," filed on Jan. 17, 2014, the entirety of which is incorporated herein by reference.

BACKGROUND INFORMATION

A wireless local area network (WLAN) may be configured to enable carrier aggregation. Specifically, depending on the type of specification (e.g., 802.11n, 802.11ac, 802.11ah, etc.) defined by the Institute of Electrical and Electronics Engineers (IEEE), a transmitting device may determine a carrier aggregation method of using more than one bandwidth to transmit data to a receiving device. The receiving device may be aware of the carrier aggregation method being used and is therefore able to receive the data using the more than one bandwidth that may increase a rate at which the data is received. The bandwidth (for select specifications) has been defined by the IEEE as a minimum of 20 MHz. Although carrier aggregation may be useful when a substantially large data transmission is scheduled, the minimum bandwidth may not fully be used when the data transmission is relatively small, thus, decreasing the efficiency of utilizing the available bandwidths.

SUMMARY

The exemplary embodiments relate to a system and method for partial bandwidth communication. The system includes a device which has a transceiver configured to connect to a network; a non-transitory memory storing an executable program stored thereon; and a processor coupled to the memory and the transceiver. The processor executes the program, the execution of the program causing the processor to perform operations comprising of the following steps:

receiving data to be transmitted to at least one second device;

determining if the data uses less than a predetermined bandwidth used as a unit for a carrier aggregation;

determining a plurality of sub-bands in the predetermined bandwidth, each sub-band including at least one pilot and a plurality of frequency tones;

receiving network information from the at least one second device, the network information indicating a preferred sub-band of the sub-bands;

assigning one of the sub-bands to the at least one second device based upon the network information;

generating a packet including an indication, the indication indicating the assigned sub-band;

transmitting the packet to the second device; and transmitting the data in the assigned sub-band.

BRIEF DESCRIPTION OF THE DRAWINGS

FIG. 2A shows a first exemplary sub-band assignment used in a partial bandwidth communication.

FIG. 2B shows a second exemplary sub-band assignment used in a partial bandwidth communication.

FIG. 4 shows an exemplary signaling field of the exemplary packet of FIG. 3 used in a partial bandwidth communication.

DETAILED DESCRIPTION

Figure 1:
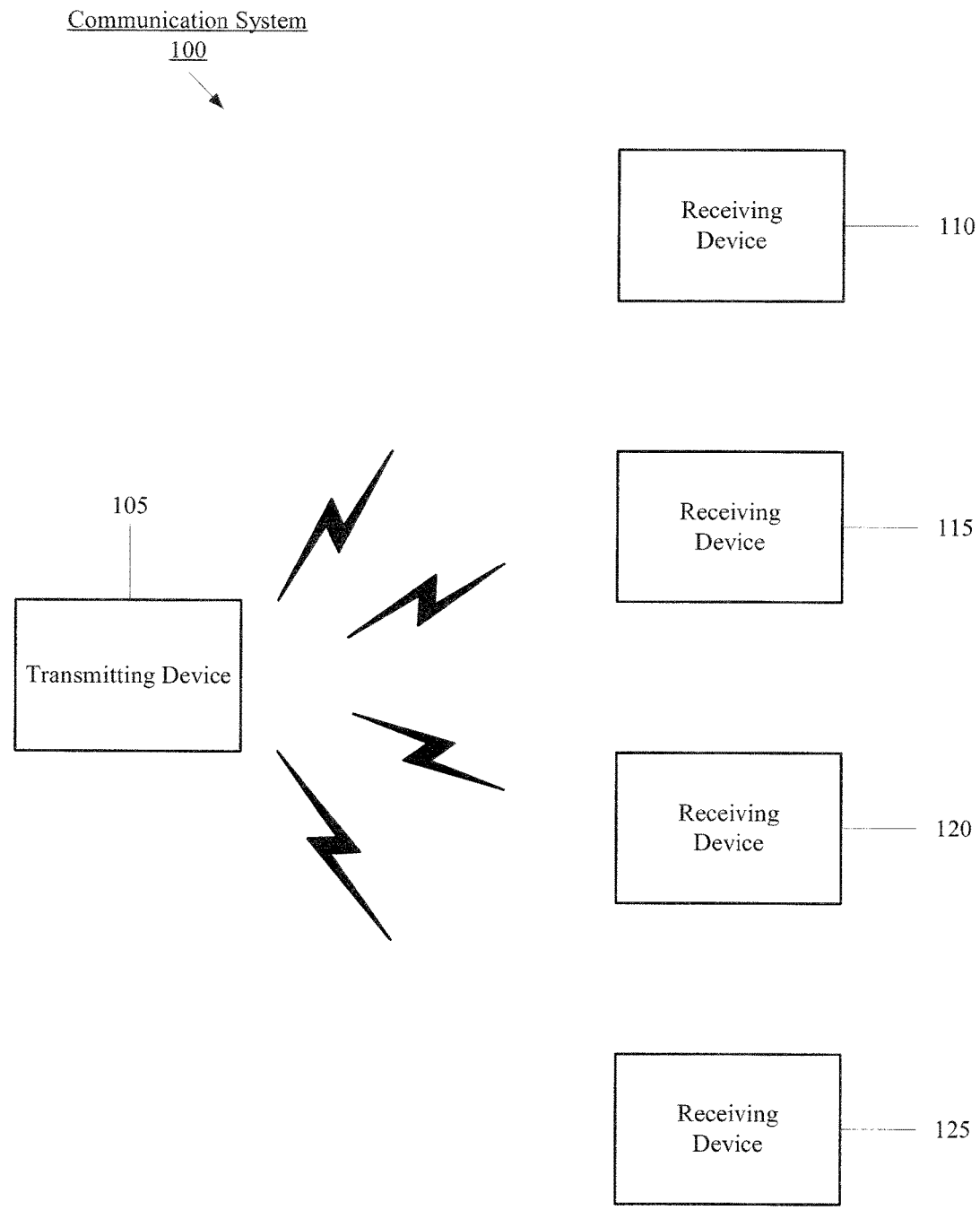
FIG. 1 shows an exemplary communication system to transmit data from a transmitting device to at least one receiving device.

The exemplary embodiments may be further understood with reference to the following description and the related appended drawings, wherein like elements are provided with the same reference numerals. The exemplary embodiments are related to a system and method for a partial bandwidth communication in a frequency division multiple access (FDMA) WLAN. Specifically, a predetermined minimum bandwidth defined for transmissions in a WLAN may be sub-divided into two or more partial bandwidths. The partial bandwidth communication may be used for data that is smaller than the minimum defined bandwidth. The use of the partial bandwidth communication may be applied to a single unit (SU) scenario or to a multiple unit (MU) scenario. The partial bandwidth communication and related components, the WLAN, the packets, and the scenarios will be described in further detail below.

Although carrier aggregation provides a mechanism to increase a rate at which data may be received and thus, increase the efficiency of receiving that data, the specifications defined by the IEEE only address one side of transmissions. Specifically, carrier aggregation only provides a mechanism for transmissions of a large amount of data. For small amounts of data, the same mechanism is used. That is, in view of the minimum bandwidth being defined for use in transmissions to be 20 MHz (for selected specifications), this bandwidth is used despite the amount of data being small and requiring only a fraction of this entire bandwidth. Therefore, the minimum bandwidth may present an inefficient manner of use for this small amount of data. Specifically, a majority of the minimum bandwidth may become wasted.

It is noted that throughout this description, it is described that a transmitting station has a "small" amount of data to transmit to receiving stations. It should be understood that there is no specific threshold for the amount of data to be quantified as "small," but is generally based on the relative amount of the data with respect to the minimum defined bandwidth. The example provided in this description, is that for a minimum defined bandwidth of 20 MHz, a small amount of data is data that may be transmitted in the same time frame using a bandwidth of 5 MHz. However, it is also possible in this scenario that a small amount of data may be data that may be transmitted in the same time frame using a bandwidth of 10 MHz. Thus, as described above, the use of the term small depends on the amount of data to be transmitted in relation to the minimum defined bandwidth.

The exemplary embodiments relate to the case when a transmitting device transmits a small amount of data to one or more receiving stations, particularly when there is not much available bandwidth. For example, when there are only two 20 MHz bandwidths available for transmission but a small amount of data are required to be transmitted to four receiving stations, then only two receiving stations are capable of receiving the data, while the remaining two receiving stations must wait for a bandwidth to become available. However, since only a small amount of data needs to be transmitted, the 20 MHz bandwidth may be sufficiently sized such that the data may be capable of being transmitted to all four receiving stations within one 20 MHz bandwidth if sub-bands are assigned.

Accordingly, the exemplary embodiments provide a mechanism for a transmitting device to select sub-bands in a single minimum bandwidth to transmit the small amount of data to one or more receiving stations. For example, a minimum bandwidth of 20 MHz may be divided into four equal sub-bands of 5 MHz. The receiving stations may be provided with information (e.g., within a packet header) indicating the specific sub-band on which the small amount of data is to be received. Furthermore, this may allow remaining available bandwidths and/or sub-bandwidths to still be available for use. As will be described in further detail below, the exemplary embodiments may also provide a mechanism to select an optimal sub-band for a select receiving device. The exemplary embodiments may additionally provide a mechanism to increase a transmission power, if available.

FIG. 1 shows an exemplary communication system 100 to transmit data from a transmitting device 105 to at least one receiving device 110-125. As will be described in further detail below, the transmitting device 105 and the receiving devices 110-125 may be configured to perform the partial bandwidth communication. Specifically, the transmitting device 105 may be configured to perform a transmitting functionality in the partial bandwidth communication, while the receiving devices 110-125 may be configured to perform a receiving functionality in the partial bandwidth communication.

The transmitting device 105 and the receiving devices 110-125 may represent any electronic device that is configured to participate in a wireless communication of data. For example, the transmitting device 105 (and/or the receiving devices 110-125) may be an end user station such as a portable device (e.g., a phone, a smartphone, a tablet, a phablet, a laptop, etc.) or a stationary device (e.g., a desktop computer, etc.). The receiving devices 110-125 (and/or the transmitting device 105) may be a network component such as an access point, a server, a router, a base station, etc. The transmitting device 105 and the receiving devices 110-125 may include a variety of components that are used in the partial bandwidth communication procedure. For example, the transmitting device 105 and the receiving devices 110-125 may include a processor, a memory arrangement, a transceiver, etc. The transmitting device 105 and the receiving devices 110-125 may execute a partial bandwidth communication application to properly transmit and receive the data.

It should be noted that one or more of the receiving devices 110-125 may be a legacy device. That is, the legacy device may be a station that is not configured with the partial bandwidth communication functionality. When the transmitting device 105 uses the partial bandwidth communication functionality with the legacy device, the legacy device may be incapable of properly interpreting the information to be used for receiving the packet. Accordingly, a different process may be utilized which will be described in further detail below.

The partial bandwidth communication functionality according to the exemplary embodiments introduce two or more sub-bands to be used within a single minimum bandwidth such that a small amount of data may be transmitted from the transmitting device 105 to one or more of the receiving devices 110-125. The sub-bands may be defined using a variety of different manners, more particularly defined according to the wireless specification being used by the devices such as IEEE 802.11n, 802.11ac, 802.11ah, etc.

Those skilled in the art will understand that the IEEE 802.11n and 802.11ac specifications enable the carrier aggregation in which the 802.11n allows for 20 or 40 MHz bandwidth transmissions, while the 802.11ac allows for 20, 40, 80, or 160 MHz bandwidth transmissions. In a substantially similar manner, the specification may also provide a framework to divide the bandwidth into the sub-bands. Specifically, the number of frequency tones related to the specification may be used in which the IEEE 802.11a/g/n specifications include fifty-two tones, while the 802.11ac specification includes fifty-six tones. According to a specific exemplary embodiment, the partial bandwidth communication functionality may divide the minimum bandwidth into four sub-bands. Furthermore, the sub-bands may be equal in length. Thus, when the minimum bandwidth is 20 MHz, the sub-bands may each be 5 MHz.

It should be noted that the use of four sub-bands is only exemplary and that any number of sub-bands may be created. For example, two sub-bands may be used. Thus, the 20 MHz bandwidth may be divided into two sub-bands, 10 MHz each when equal in length. It should also be noted that the use of equal sub-bands is also only exemplary and the sub-bands may also be different in length. The length of the sub-bands may be defined using various criteria as will be described below. However, for illustrative purposes, the minimum exemplary bandwidth of 20 MHz will be described below as being divided into four equal sub-bands of 5 MHz.

FIG. 2A shows a first exemplary sub-band assignment 200 used in a partial bandwidth communication. The sub-band assignment 200 shown in FIG. 2A relates to the IEEE 802.11a/g/n specifications in which fifty-two tones are included. Those skilled in the art will understand that the fifty-two tones may include forty-eight data tones 205 and four pilots 210. For example, when the tones range from tone indexes −26 to 26, the pilots 210 may be at tone indexes −21, −7, 7, and 21. This may enable up to four sub-bands to be used. Specifically, one of the criteria for selecting the sub-bands is that at least one pilot is to be included therein. Thus, each sub-band may include twelve data tones 205 and one pilot 210. Specifically, a lowest sub-band may be from tone index −26 to tone index −14 in which the pilot 210 is at tone index −21; a second lowest sub-band may be from tone index −13 to tone index −1 in which the pilot 210 is at tone index −7; a second highest sub-band may be from tone index 1 to tone index 13 in which the pilot 210 is at tone index 7; and the highest sub-band may be from tone index 14 to tone index 26 in which the pilot 210 is at tone index 21.

FIG. 2B shows a second exemplary sub-band assignment 250 used in a partial bandwidth communication. The sub-band assignment 250 shown in FIG. 2B relates to the IEEE 802.11ac specification in which fifty-six tones are included. Those skilled in the art will understand that the fifty-six tones may include fifty-two data tones 205 and four pilots 210. For example, when the tones range from tone indexes −28 to 28, the pilots 210 may again be at tone indexes −21, −7, 7, and 21. Thus, each sub-band may include thirteen data tones 205 and one pilot 210. Specifically, a lowest sub-band may be from tone index −28 to tone index −15 in which the pilot 210 is at tone index −21; a second lowest sub-band may be from tone index −14 to tone index −1 in which the pilot 210 is at tone index −7; a second highest sub-band may be from tone index 1 to tone index 14 in which the pilot 210 is at tone index 7; and the highest sub-band may be from tone index 15 to tone index 28 in which the pilot 210 is at tone index 21.

It should be noted that the above examples provide sub-band assignments such that the pilots 210 may be positioned in a substantially central position with regard to the sub-band. However, this is only exemplary. According to a further exemplary sub-band assignment, the sub-bands may be shifted such that the pilots are positioned toward an end of the sub-band. However, so long as the criteria to include at least one pilot 210 in each sub-band is satisfied, such a sub-assignment may be used.

Figure 3:
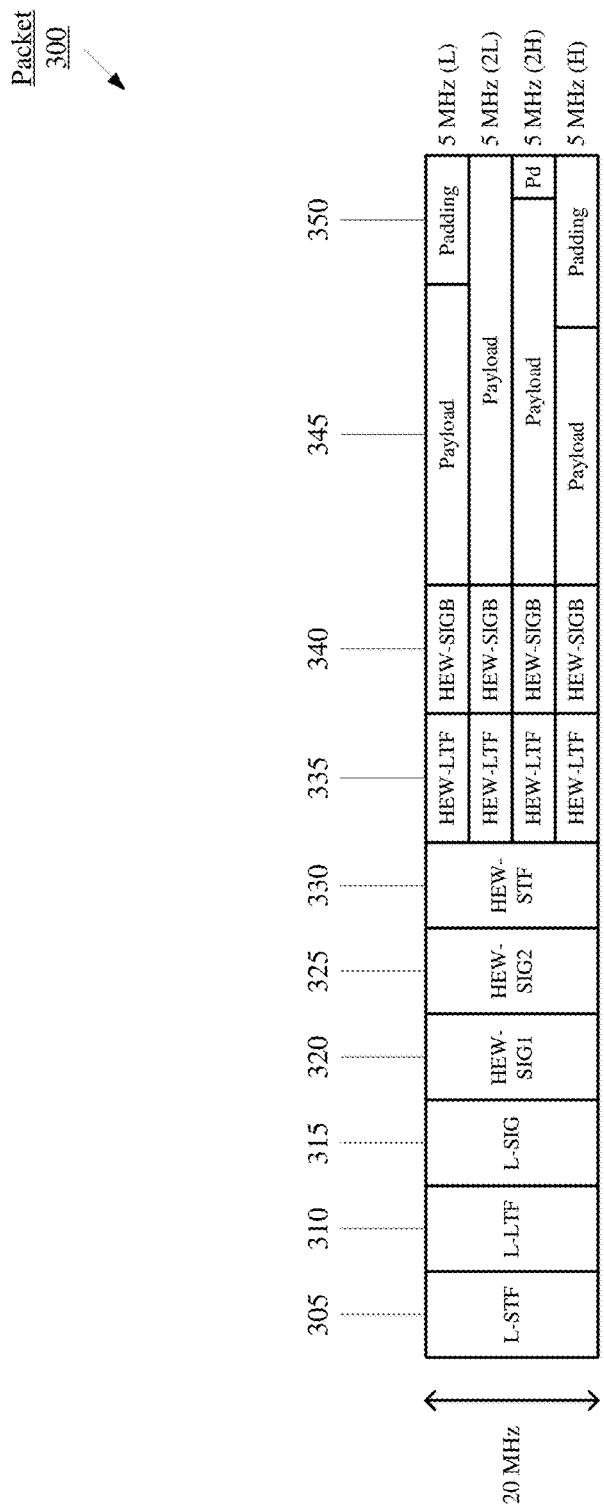
FIG. 3 shows an exemplary packet used in a partial bandwidth communication.

FIG. 3 shows an exemplary packet 300 used in a partial bandwidth communication. Specifically, the packet 300 may represent a packet structure used in the partial bandwidth communication. Accordingly, the packet 300 may be generated by the transmitting device 105 and transmitted to at least one of the receiving devices 110-125. The packet 300 may also include the small bandwidth packet that is transmitted in the WLAN. As illustrated, the packet 300 may have a mixed format including a preamble that utilizes a 20 MHz bandwidth operation in which the preamble includes a legacy short training field (STF) (L-STF) 305, a legacy long training field (LTF) (L-LTF) 310, a legacy signal field (SIG) (L-SIG) 315, a first high efficiency WLAN (HEW) SIG (HEW-SIG1) 320, a second HEW SIG (HEW-SIG2) 325, and a HEW STF 330 and a data section that utilizes a 5 MHz bandwidth operation in which the data section includes the sub-bands, each sub-band including a HEW LTF 335, a further HEW SIG (HEW-SIGB) 340, a payload 345, and an optional padding 350.

As one skilled in the art will understand, the L-STF 305, the L-LTF 310, the L-SIG 315, the HEW-SIG1 320, the HEW-SIG2 325, and the HEW-STF 330 may provide known functionalities substantially similar to when only the 20 MHz operation is used. For example, the L-STF 305 may be identical to the 802.11a short training orthogonal frequency-division multiplexing (OFDM) symbols used to "train" the device by detecting a start of a sequence and setting an automatic gain control (AGC). The L-LTF 310 may also provide a similar functionality as the 802.11a long training OFDM symbols used for channel estimation and for more accurate frequency offset estimation and time synchronization. The L-SIG 315 may include rate and length information for the packet.

With the introduction of the HEW fields, the partial bandwidth communication functionality may also be defined for a transmission operation. Specifically, the HEW-SIG1 320 and the HEW-SIG2 325 may provide rate and length information for the packets of the sub-bands. That is, the length may indicate a maximum length of the packets used in the four 5 MHz sub-bands. As will be described in further detail below, the HEW-SIG1 320 may also indicate whether or not the packet has a 5 MHz sub-band FDMA operation and, if so, a target receiving device assigned to a select 5 MHz sub-band. The HEW-STF 330 may provide a substantially similar functionality to indicate the start of the packet. Since the HEW-STF 330 provides this indication, the subsequent data portion may include the sub-bands.

When partial bandwidth communication is used, the HEW-LTF 335 may provide the information that LTF normally provides. However, the HEW-LTF 335 may relate specifically to the sub-band being used. Thus, the lowest sub-band (L), the second lowest sub-band (2L), the second highest sub-band (2H), and the highest sub-band (H) may each include a corresponding HEW-LTF 335 indicating the information used in the estimations. The HEW-SIGB 340 may also provide the information that SIG normally provides. Like the HEW-LTF 335, the HEW-SIGB 340 may relate specifically to the sub-band being used. The HEW-SIGB 340 may provide the information used in determining the rate and length information for the data portion.

The remaining portions of the data portion may be the payload 345 and the optional padding 350. Specifically, the payload 345 includes the actual data to be transmitted to the receiving devices 110-125. Thus, the short packet may have its data in the payload 345. As discussed above, the HEW-SIGB 340, the HEW-SIG1 320, the HEW-SIG2 325, and/or the L-SIG 315 may indicate (directly or indirectly) a total length for the payload 345. The payload 345 may or may not occupy the entire available total length. When the total length is used such as in the second lowest sub-band 2L, no padding is required. However, if the payload 345 does not use the entire length, a remaining length is supplemented with the padding 350 such as "0" values. As shown, the second highest sub-band 2H has a payload 345 in which a smallest padding 350 is used; the highest sub-band H has a payload 345 in which a largest padding 350 is used; and the lowest sub-band L has a payload 345 in which an intermediate size padding 350 is used.

It is noted that the exemplary packet structures described herein are only used to illustrate one potential manner of implementing the sub-bandwidth communications within the minimum defined bandwidth. Those skilled in the art will understand that other types of packet structures or data structures may be used to implement the sub-bandwidth communications in accordance with the principles described herein.

As discussed above, the HEW-SIG1 320 may provide the information to indicate the partial bandwidth communication functionality being used and the sub-band assigned to select receiving devices. FIG. 4 shows an exemplary HEW-SIG1 320 of the exemplary packet 300 of FIG. 3 used in a partial bandwidth communication. The HEW-SIG1 320 may be a 24-bit field including a variety of different sub-fields. As illustrated in FIG. 4, the HEW-SIG1 320 may include a bandwidth (BW) sub-field (including two bits), a Partial BW bit sub-field (including one bit), a space-time block coding (STBC) sub-field (including one bit), a group identification (ID) sub-field (including six bits), a plurality of space-time streams (STS) sub-fields (each including three bits), further sub-fields, and a reserved sub-field (including one bit).

It should be noted that when conventional 20 MHz transmissions are performed, the Partial BW bit sub-field is simply set to 1 such that the BW sub-field indicates the carrier aggregation configuration. For example, when the Partial BW bit sub-field is set to 1 and the specification is IEEE 802.11ac, the BW sub-field may be set as 00 (indicating a 20 MHz transmission operation), 01 (indicating a 40 MHz transmission operation), 10 (indicating a 80 MHz transmission operation), or 11 (indicating a 160 MHz transmission operation). Furthermore, there may be only one STS sub-field since the use of more than one relates to the partial bandwidth communication functionality.

According to the exemplary embodiments, the transmitting device 105 may generate the HEW-SIG1 320 to indicate the manner in which the partial bandwidth communication functionality is to be used. As will be described in further detail below, the transmitting device 105 may receive select information from the receiving devices 110-125 to contribute in determining the manner of operation. Although this feature may enable a more efficient selection process of the sub-band, it should be noted that the transmitting device 105 may select (e.g., randomly) the sub-band to be used.

When the partial band functionality is used, the transmitting device 105 sets the Partial BW bit sub-field to 0. When setting the Partial BW bit to 0, this may indicate to the receiving devices 110-125 that the partial band communication functionality is being used. The transmitting device 105 may also use the BW sub-field to identify which sub-band is being assigned to the receiving device. For example, the BW sub-field may again be set using 00, 01, 10, and 11. However, setting the value in the BW sub-field has a new meaning. That is, setting the BW sub-field to 00 may identify that the lowest sub-band L is used; to 01 may identify that the second lowest sub-band 2L is used; to 10 may identify that the second highest sub-band 2H is used; and to 11 may identify that the highest sub-band H is used.

The group ID sub-field may identify whether the partial bandwidth communication operation relates to only one receiving device or to more than one receiving device. For example, if the group ID sub-field is set to 0, this may indicate to the receiving device that the partial bandwidth communication functionality is set for a single unit. Accordingly, the Partial BW bit sub-field set to 0 indicates that the partial bandwidth communication functionality is being used; the group ID sub-field set to 0 indicates that the receiving device is the only device receiving this packet; and the BW sub-field set to, for example, 10 indicates that the second highest sub-band is being used. In another example, if the group ID sub-field is set to a non-zero number, this may indicate to the receiving devices 110-125 that the partial bandwidth communication functionality is set for multiple units (i.e., more than one (two or more) receiving device). The group ID sub-field may provide the information to identify the order of the receiving devices that further identifies which sub-band assigned to each. For example, if all four receiving devices 110-125 are included for the partial bandwidth communication, the order may be provided in the group ID sub-field as the receiving device 120, the receiving device 115, the receiving device 125, and the receiving device 110. Therefore, the receiving device 120 may be assigned the lowest sub-band L; the receiving device 115 may be assigned the second lowest sub-band 2L; the receiving device 125 may be assigned the second highest sub-band 2H; and the receiving device 110 may be assigned the highest sub-band H.

It should be noted that when the HEW-SIG1 320 is with FDMA, the spatial multiple input-multiple output (MIMO) may be disabled. It should also again be noted that there may be a pilot tone in a substantial middle position of each sub-band (e.g., at tone index −21, −7, 7, and 21). As discussed above, the transmitting device 105 may select the sub-band for the receiving devices based upon feedback from the receiving devices 110-125 or a measurement of an uplink channel (based on a reciprocity assumption). The transmission power and modulation and coding scheme (MCS) may be associated with the measured sub-channel response.

Figure 5:
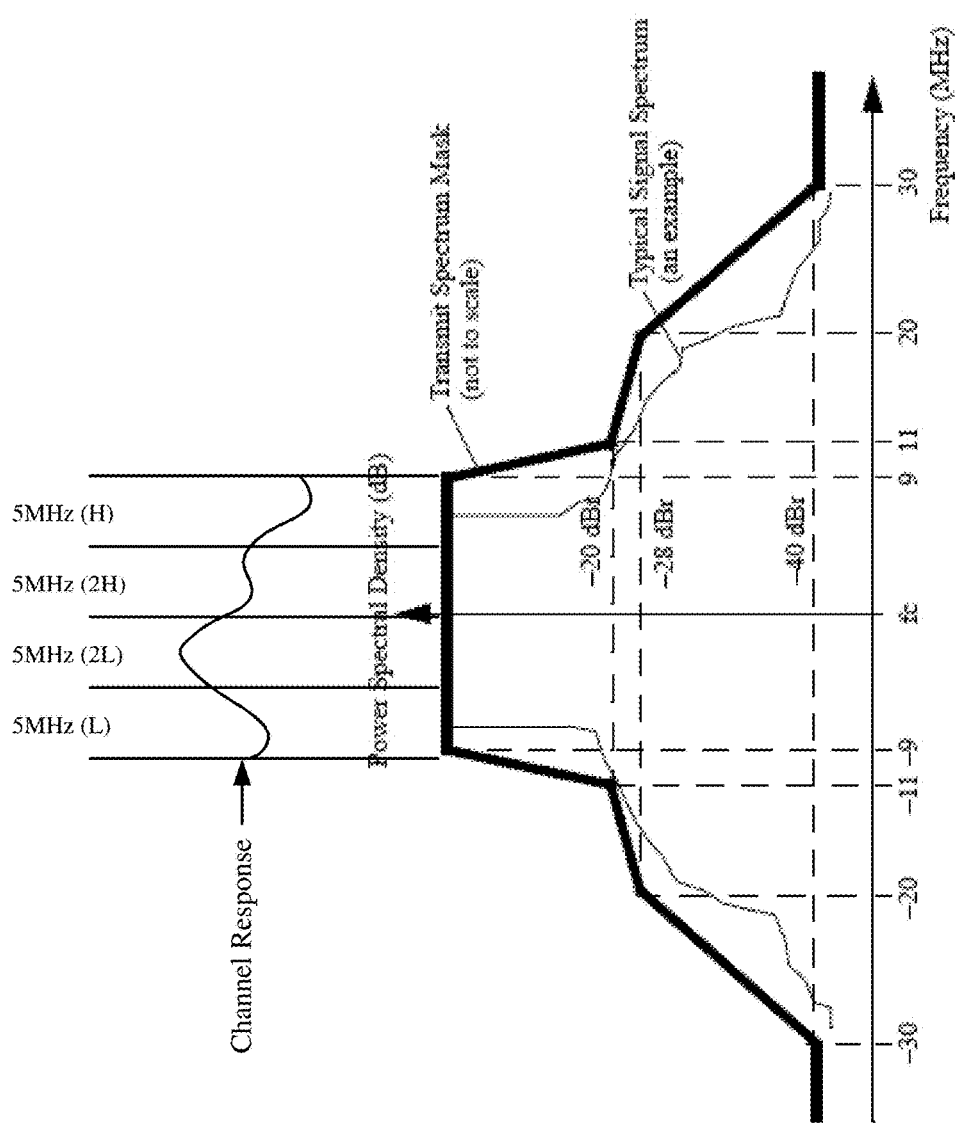
FIG. 5 shows an exemplary signaling response used as a basis in a partial bandwidth communication.

FIG. 5 shows an exemplary signaling response used as a basis in a partial bandwidth communication. Specifically, the signaling response may be a measurement determined by the receiving device and provided to a bandwidth controller (associated with either the transmitting device 105 and/or the receiving devices 110-125). For example, a channel response graph may be determined to indicate which sub-band may be most optimal for the respective receiving device. Accordingly, each receiving device may indicate the most optimal sub-band within the 20 MHz bandwidth that is being used. As illustrated in the signaling response of FIG. 5, the second lowest sub-band may be preferred for this receiving device. Using this information, the transmitting device 105 may select the sub-band to be used.

It should be noted that when there is only a single receiving device, the channel response may indicate only the most preferred sub-band to be used. However, when there is more than one receiving device, the channel response may indicate an order of the sub-bands to be used. As illustrated in the signaling response of FIG. 5, the order may indicate that the second lowest sub-band 2L is most preferred, followed by the second highest sub-band 2H, followed by the lowest sub-band L, and finally the highest sub-band H. When each of the receiving devices 110-125 provides this information, the transmitting device 105 may be able to determine the most optimal selection for each of the receiving devices 110-125.

As discussed above, the transmission power may also be selected by the transmitting device 105. When the group ID sub-field indicates that there is only one receiving device (single unit) with four sub-bands, the transmission power used to transmit the packet from the transmitting device 105 to the receiving device may be modified. Those skilled in the art will understand that each minimum 20 Mhz bandwidth used in the WLAN has an associated allowable transmission power that may be used (as defined by the Federal Communications Commission (FCC)). The FCC rule indicates that the 20 MHz bandwidth may use any transmission power so long as it does not exceed the maximum allowed power. Therefore, with only one sub-band being used for the one receiving device in the partial bandwidth communication operation, the other three sub-bands may be "nulled" (which is also an acceptable practice under the FCC rules). With only one sub-band operational, the entire allowed transmission power may be dedicated to this one sub-band. Accordingly, a transmission power that is four times greater than would otherwise be used in a single sub-band may be used from the partial bandwidth communication operation.

When there is more than one receiving device, the transmission power may also be modified. For example, when there are four receiving devices 110-125 with four sub-bands, the transmitting device 105 may dedicate one quarter of the allowed transmission power to each sub-band assigned to each of the receiving devices 110-125. It should be noted that no sub-band is nulled. In another example, when there are two receiving devices with four sub-bands, the transmitting device 105 may dedicate one half of the allowed transmission power to the sub-bands being used which are assigned to respective one of the receiving devices 110-125. The other two sub-bands may be nulled.

Figure 6:
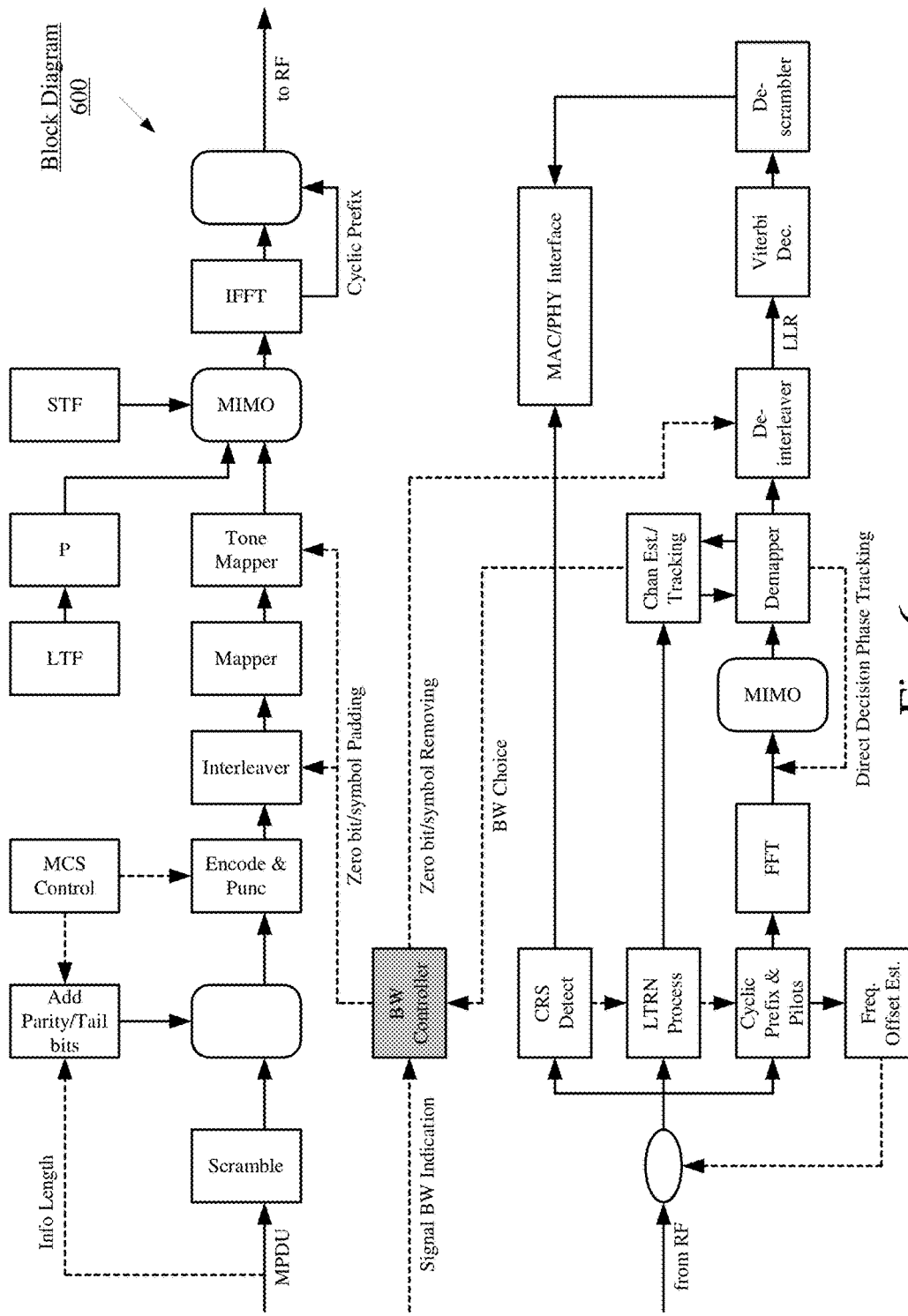
FIG. 6 shows an exemplary block diagram of transmitting and receiving devices used in a partial bandwidth communication.

FIG. 6 shows an exemplary block diagram 600 of the transmitting device 105 and the receiving devices 110-125 used in a partial bandwidth communication. Specifically, the block diagram 600 illustrates components of the transmitting device 105 and the receiving devices 110-125 used in the partial bandwidth communication operation as well as select signaling information. That is, the block diagram 600 illustrates a manner of generating the packet 300 for transmission to the receiving devices 110-125 as well as a manner of decoding the packet 300 upon receiving it from the transmitting device 105.

As illustrated, the top half of the block diagram 600 may represent the transmitting device 105 while the bottom half of the block diagram 600 may represent the receiving devices 110-125. The bandwidth (BW) controller may represent an intermediary component that provides the information used in the partial bandwidth communication operation to the transmitting device 105 and the receiving devices 110-125. However, as discussed above, the bandwidth controller may be an associated component of the transmitting device 105 and/or the receiving devices 110-125 or may be a wholly separate component configured for this functionality.

Initially, the transmitting device 105 may receive a Media Access Control (MAC) Protocol Data Unit (MPDU) that includes the data to be transmitted to one or more receiving devices 110-125. Accordingly, the MPDU may be received from the MAC Layer of the transmitting device 105. The transmitting device 105 may include a plurality of modules used in generating the packet 300 such as the scramble module, the encoding & punctuating module, the interleaver, the mapper, the tone mapper, the MIMO, the Inverse Fast Fourier Transformer (FFT) (IFFT) module, the parity/tail bits adding module, the STF and LTF modules, and the MCS control, whose functionalities are known to those skilled in the art.

The MPDU may have a particular length. The length information may be provided to the parity/tail bits adding module which also receives information from the MCS control. As discussed above, each sub-band has its own encoder and modulator which bypasses the stream parser in which each encoder and modulator may have a different MCS.

Through the above modules, the transmitting device 105 may generate the packet 300 including the modified HEW-SIG1 320. That is, the information received from the MAC layer and the bandwidth controller may be used as the basis of selecting and assigning the sub-band to be used by the receiving device in the partial bandwidth communication operation. By incorporating this information in the HEW-SIG1 320, the packet 300 may be provided to the receiving devices 110-125 in a way that the sub-bands may be known to receive the data of the MPDU. It should be noted that the transmitting device 105 may also determine the transmission power to be used based upon the received information.

As discussed above, the receiving devices 110-125 may also provide a channel response or corresponding information to the bandwidth controller. As shown in FIG. 6, the signal bandwidth indication may be provided to the bandwidth controller. The bandwidth controller may also receive a bandwidth choice from the receiving devices 110-125. The bandwidth controller may subsequently provide zero bit/symbol padding information to the interleaver and tone mapper of the transmitting device 105. Accordingly, the transmitting device 105 may be configured to select the sub-band to be used by the receiving device as well as properly define the LTF for the padding to be included.

The receiving devices 110-125 (or select ones) may receive the packet 300 which is provided to a plurality of modules such as a CRS detection module, a LTRN process module, and a cyclic prefix & pilots module. These modules may also provide information amongst themselves while the frequency offset estimation module may provide feedback. The CRS detection module may subsequently provide information to the MAC/physical (PHY) layer Interface.

The receiving devices 105 may decode the packet 300 using corresponding components such as a FFT module, a MIMO module, a demapper module, a channel estimation/tracking module, a deinterleaver module, a Viterbi dec. module, and a descrambler module. It should be noted that the channel estimation/tracking module may be configured to measure the network parameters to provide the bandwidth choice including the channel response information. Furthermore, the bandwidth controller may provide the zero bit/symbol removing information to the deinterleaver for the decoding process.

Thus, the receiving devices 110-125 may receive the packet 300 from the transmitting device 105. If properly configured, the receiving devices 110-125 may decode the HEW-SIG1 320 to determine the sub-band that it has been assigned in order to receive the small packet. Therefore, after the FFT module, the other tones not used by the assigned sub-band may be truncated before decoding. The packet may subsequently be decoded and the data therein may be processed.

As discussed above, there may be further specifications under IEEE. For example, the IEEE 802.11ah specification does not utilize the 20 MHz bandwidth. Instead, it utilizes a 2 MHz bandwidth by downsampling the 802.11ac specification and operating at the 900 MHz band only. It should be noted that 802.11ah enables carrier aggregation with a total of 26 MHz bandwidth available in the United States and 4-8 MHz bandwidth for Asia and Europe. However, the exemplary embodiments of partial bandwidth communication operation may still be utilized in a substantially similar manner. For example, the 2 MHz bandwidth under 802.11ah may be divided into two sub-bands of 1 MHz each.

It should be noted that the transmitting device 105 and the receiving devices 110-125 may be HEW devices. That is, the HEW devices may be configured with the hardware and software to perform the partial bandwidth communication functionality. However, the receiving devices may also include legacy devices that are incapable of performing the partial bandwidth communication functionality. In such a case, the legacy devices are incapable of understanding the information included in the HEW-SIG1 320. As such, the packet may be dropped by legacy devices.

The exemplary embodiments provide a system and method to enable sub-bands of a minimum bandwidth to be used for transmission of a small packet to one or more receiving devices. Specifically, a 20 MHz bandwidth used as a base unit in a carrier aggregation scheme may be divided into four sub-bands of 5 MHz such that with one receiving device, an increased transmission power may be dedicated to a single sub-band for the transmission or multiple receiving devices may utilize the sub-bands to receive the packet while only requiring a single 20 MHz bandwidth.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform, MAC OS, iOS, Android OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method for High-Efficiency WLAN (HEW) communication, comprising:

at a transmitting device:

receiving data to be transmitted to at least one receiving device;

determining if the data uses less than a predetermined bandwidth used as a unit for carrier aggregation;

determining a plurality of sub-bands in the predetermined bandwidth, each sub-band including at least one pilot and a plurality of frequency tones;

receiving network information from the at least one receiving device, the network information includes identifying a preferred order of the plurality of sub-bands, wherein the preferred order of the sub-bands is based upon a frequency response of the sub-bands for the at least one receiving device;

assigning one of the sub-bands to the at least one receiving device based upon the network information;

generating a packet including an indication, the indication indicating the assigned sub-band, and wherein the packet further includes identifying an order of the at least one receiving device wherein the order of the at least one receiving device is based on the network information and further identifies which sub-band is assigned to which at least one receiving device;

transmitting the packet to the at least one receiving device; and transmitting the data in the assigned sub-band.

2. The method of claim 1, wherein:

the at least one receiving device includes four receiving devices, the sub-bands include four sub-bands, and each of the four receiving devices is assigned to a unique one of the four sub-bands.

3. The method of claim 2, wherein the unique sub-band is assigned to a corresponding receiving device as a function of the preferred order of the sub-bands.

4. The method of claim 1, wherein:

the at least one receiving device includes a single receiving device, the sub-bands include four sub-bands, and the single receiving device is assigned only to one of the four sub-bands.

5. The method of claim 1, wherein each of the sub-bands is equal in length.

6. The method claim 1, wherein the network information further includes at least one of a transmission power and modulation and coding data.

7. A method for High-Efficiency WLAN (HEW) communication, comprising:

at a receiving device:

receiving a packet from a transmitting device including an indication, the indication including sub-band information wherein the sub-band information identifies an order of an at least one receiving device, wherein the order of the at least one receiving device is based on feedback information transmitted to the transmitting device by the at least one receiving device and identifies which sub-band the transmitting device has assigned to which at least one receiving device;

determining an assigned sub-band based upon the sub-band information, the assigned sub-band being one of a plurality of sub-bands in a predetermined bandwidth used as a unit for carrier aggregation; and receiving data from the transmitting device in the assigned sub-band, the data being determined to use less than the predetermined bandwidth.

8. The method of claim 7, wherein each of the sub-bands is equal in length.

9. A device for High-Efficiency WLAN (HEW) communication, comprising:

a transceiver configured to connect to a network;

a non-transitory memory storing an executable program stored thereon; and a processor coupled to the memory and the transceiver, wherein the processor executes the program, the execution of the program causing the processor to perform operations comprising the following steps:

receiving data to be transmitted to at least one second device;

determining if the data uses less than a predetermined bandwidth used as a unit for a carrier aggregation;

determining a plurality of sub-bands in the predetermined bandwidth, each sub-band including at least one pilot and a plurality of frequency tones;

receiving network information from the at least one second device, the network information includes identifying a preferred order of the plurality of sub-bands, wherein the preferred order of the sub-bands is based upon a frequency response of the sub-bands for the at least one second device;

assigning one of the sub-bands to the at least one second device based upon the network information;

generating a packet including an indication, the indication indicating the assigned sub-band, and wherein the packet further includes identifying an order of the at least one second device wherein the order of the at least one second device is based on the network information and further identifies which sub-band is assigned to which at least one second device;

transmitting the packet to the at least one second device; and transmitting the data in the assigned sub-band.

10. The device of claim 9, wherein the at least one second device includes four second devices, wherein the sub-bands include four sub-bands, and wherein each of the second device is assigned a unique one of the four sub-bands.

11. The device of claim 9, wherein the at least one second device includes a single second device, wherein the sub-bands includes four sub-bands, and wherein the second device is assigned to only one of the four sub-bands.

12. The device of claim 9, wherein the memory stores a further executable program and wherein the processor executes the further program, the execution of the further program causing the processor to perform operations comprising of the following steps:

receiving a packet from a third device including an indication, the indication including sub-band information;

determining an assigned sub-band based upon the sub-band information, the assigned sub-band being one of a plurality of sub-bands in a predetermined bandwidth used as a unit for carrier aggregation; and receiving data from the third device in the assigned sub-band, the data being determined to use less than the predetermined bandwidth.

13. The device of claim 9, wherein each of the sub-bands is equal in length.

14. The device claim 9, wherein the network information further includes at least one of transmission power data and modulation and coding data.

15. The device of claim 9, wherein the unique sub-band is assigned to a corresponding receiving device as a function of the preferred order of sub-bands.

16. The method of claim 1, wherein the preferred order of sub-bands comprises a first preferred sub-band and wherein the first preferred sub-band is the sub-band with the highest frequency response of the sub-bands.

17. The method of claim 1, further comprising determining a transmission power to use to transmit the packet to the at least one receiving device, wherein the transmission power does not exceed a maximum allowed transmission power.

18. The method of claim 17, wherein when the packet identifies a single receiving device the maximum allowed transmission power is dedicated to the sub-band assigned to the single receiving device.

19. The method of claim 17, wherein when the packet identifies a plurality of receiving devices the transmission power dedicated to each of the sub-bands assigned to the plurality of receiving devices is an equal fraction of the maximum allowed transmission power.

* * * * *